June 14, 1960 A. L. STARCK 2,940,417

INDEX CARRIER FOR MAGNETIC RECORDING STRIPS

Filed July 3, 1957 2 Sheets-Sheet 1

INVENTOR

ANDRÉ LOUIS STARCK

BY Irwin S. Thompson

ATTY.

June 14, 1960 A. L. STARCK 2,940,417

INDEX CARRIER FOR MAGNETIC RECORDING STRIPS

Filed July 3, 1957 2 Sheets-Sheet 2

INVENTOR

ANDRÉ LOUIS STARCK

BY Irwin S. Thompson

ATTY.

United States Patent Office 2,940,417

Patented June 14, 1960

2,940,417

INDEX CARRIER FOR MAGNETIC RECORDING STRIPS

André Louis Starck, 7 Boulevard de Dixmude, Paris, France

Filed July 3, 1957, Ser. No. 669,839

Claims priority, application France July 6, 1956

1 Claim. (Cl. 116—114)

My invention has for its object an index carrier for a magnetic recording strip.

The duration of the records on a magnetic ribbon is of the magnitude of one hour in the case of conventional spools of a length of say 360 metres and it may reach three hours and more in the case of large spools. Consequently, each spool carries generally a multiplicity of different records which it may be desired to listen to at different more or less frequent intervals, said intervals being sometimes as long as a number of months or years.

Now, there are no practical means at the present moment for locating on the strip the different records made on it and these different records on it can be found only by listening to the complete record at the normal speed of progression which leads consequently to a considerable loss of time.

My present invention has for its object to provide an index adapted to be associated with each spool in the shape of a plurality of radial elements each provided with a tangential reference mark defining the location of a corresponding elementary record. This allows an easy and convenient finding of the different records or fractions of records carried on a given strip spool with a loss of time which is practically negligible.

My improved index carrier is constituted advantageously by a disc or flange carrying, within an annular area comprised between the maximum and minimum diameters of the spool with which it is associated, a network of substantially radial reference lines which are angularly equidistant and which are provided each with a tangentially extending reference mark corresponding to a predetermined winding diameter of the spool. Through this arrangement, it is apparent that when winding or unwinding the spool, the strip entering or passing out of the spool passes in succession through the different tangential reference marks: each of these passages materializes thus a predetermined moment of the total duration of reproduction. Said duration being subdivided into a number of unitary sub-periods of any desired duration, say one minute or one half minute for instance, a tangental reference mark and a corresponding substantially radial line will be associated at the beginning of each of said intervals or sub-periods.

These sub-periods may advantageously correspond in numerical sequence with numbers arranged on an annular scale provided at the periphery of the disc or flange, the scale subdivisions registering with the terminal points of the lines associated with the different tangential reference marks.

The titles or references for the different elementary records or record fractions may be written down directly on the corresponding reference lines or else on an auxiliary synopsis referring to the numbers of the reference marks, this being similar to the table of contents of a book which refers back to the numbers on the pages of the latter.

The disc or flange may include advantageously one or more radially projecting tongues which allow holding it fast by hand so as to allow reading it during the unwinding of the strip at a high speed in either direction.

The disc or flange may be made of a translucent or transparent material in which case the tangential reference marks are reduced to mere lines or else of an opaque material in which case each tangential reference mark will be associated with a perforation allowing observation of the passage of the strip off or onto a point of the strip at a corresponding radial distance.

According to a modification, the different reference marks are formed on corresponding tongues pivotally secured to an eye which may be fitted over the spindle carrying the spool, so as to form a sort of gauge, said gauge opening fan-wise round the eye to form with a further degree of freedom an arrangement similar to the disc which has been described hereinabove.

The different features and advantages of my invention will be understood more clearly from the following description given by way of example, reference being made to the accompanying drawings, wherein.

Figure 1:
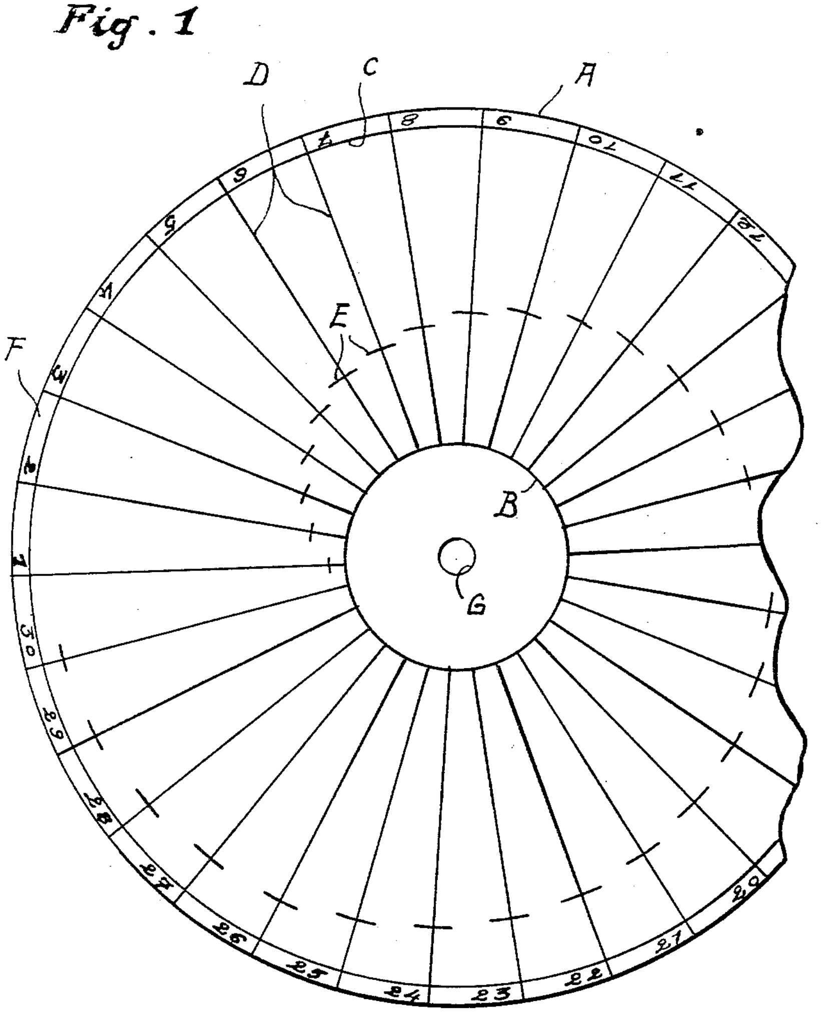
Fig. 1 illustrates an index disc according to my invention.

Turning to the embodiment illustrated in Fig. 1, there is provided an index-carrying flange A made of any suitable transparent material and including within an annular area bounded by an inner circle B and an outer circle C, a series of radial reference lines which are angularly equidistant D, each of said reference lines being crossed by a short tangential reference bar or mark E. The peripheral scale-carrying annulus F carries a series of numbers, ranging between say 1 and 30 as in the case illustrated for designating the different radial reference lines. The flange is furthermore provided with a central opening G.

The reference disc or flange thus constituted is intended for use with a spool of a magnetic recording strip the hub of which has a diameter which is substantially equal to that of the inner circle B while the outer circle C corresponds to the maximum diameter of the strip wound over said spool. The central opening G is intended to provide for the fitting with a small clearance of the flange over the carrier spindle of the spool. The annular area left free between the central opening G and the inner circle B may serve for carrying inscriptions required for identifying the spool and possibly the surface or track associated with the flange.

When the strip is wound over the spool, it passes in succession in registry with the tangential reference marks or bars E corresponding to the different radial reference lines numbered from 1 to 30 on the peripheral scale. The passage from one number to the next may correspond for instance to a sub-period of two minutes of reproduction at a speed of unwinding of 9.5 cm./s. and of one minute for a speed of 19 cm./s. The radial reference lines D may serve as supports for inscriptions giving the titles or references of the corresponding records on the strip.

Figure 2:
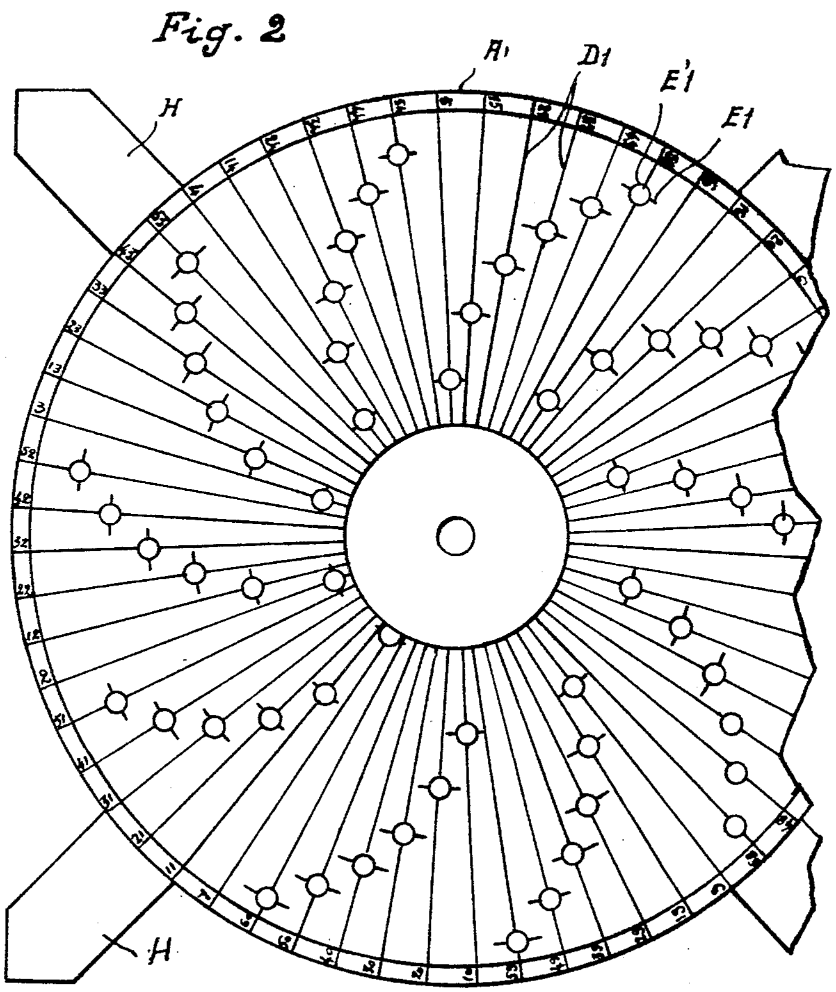
Fig. 2 is a similar view of a further embodiment.

Fig. 2 illustrates a modification including a disc or flange A1 of opaque material wherein the reference marks E1 are associated with circular perforations E'1 which allow observing the passage of the strip in registry with each reference mark. The reference marks E1 and the radial reference lines D1 are in the case illustrated in Fig. 2 in the number of sixty. It is apparent that the successive reference marks are arranged in the present case along a spiral line including several convolutions with an angular gap or pitch between successive reference marks corresponding to six radial lines. This arrangement has for its advantage a cutting out of any undesirable weakening of the flange by successive perforations lying too near one another.

The flange is provided in the case of Fig. 2 with radially projecting tongues H which allow holding fast the disc during the rotation of the spool over which it is positioned. It will be remarked that these tongues are inscribed inside the square circumscribing the flange so that the latter may be housed readily with the tongues inside the conventional box provided for the spool.

Obviously, the index carrying disc or flange may be given any desired diameter and correspond to any desired duration of recording and to any speed of unwinding.

The reference lines, instead of being rectilinear and radial may be oblique with reference to the radii of the flange and they may be given any desired shape which may in fact be that of a broken or incurved line.

Figure 3:
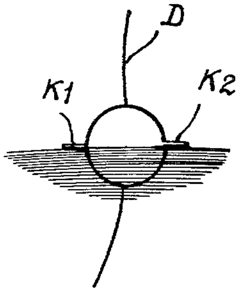
Figs. 3 to 5 show on a larger scale various shapes which may be given to the reference marks and to the tangential perforations.
Figure 4:
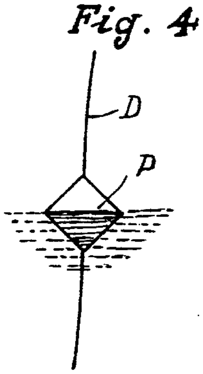
Figure 5:
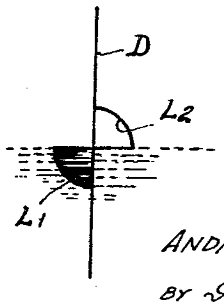

Figs. 3 to 5 show differently shaped perforations which may be used as tangential reference marks the shapes of which allow improving the accuracy of reading. The perforation illustrated in Fig. 3 is circular and includes two radial extensions K1 and K2 in the shape of thin slots extending along the opposite ends of a diameter of the perforation perpendicular to the radius of the flange. Such a perforation allows observing in a highly accurate manner with a reduction to a minimum of the parallactic error the moment at which the ribbon passes through the tangential reference marks constituted in the present case by the alined edges of the two slots.

Fig. 4 shows a perforation in the shape of a lozenge of which one diagonal line P forms the tangential reference mark; it is an easy matter to observe the moment at which the periphery of the spool becomes tangential to said diagonal line P.

Fig. 5 shows a tangential reference mark registering with a radial reference line D, said mark being constituted by two diametrically opposed open sectors L1 and L2, the moment of the passage of the spool through said reference mark being defined by the passage of the periphery of the spool from a point registering with one sector to a point registering with the other.

Figure 6:
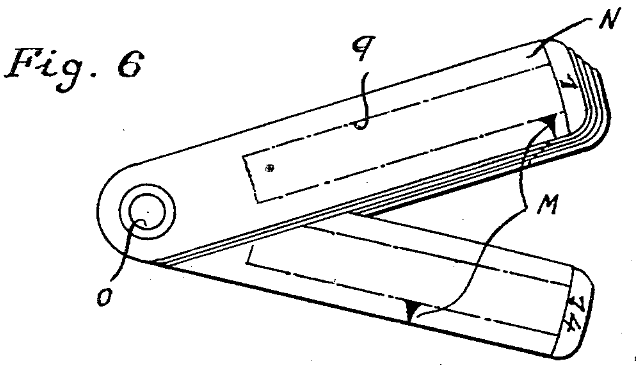
Fig. 6 shows a modified embodiment in the shape of a gauge.

In the modified embodiment illustrated in Fig. 6, the different reference marks constituted for instance by arrows M are formed on as many tongues N pivotally secured to a common eye O adapted to be fitted over the carrier spindle of the spool so as to form thus a gauge each element of which may carry, for instance, inside a framing line Q a characteristic inscription such as a title, a reference or the like, corresponding to the fraction of the record beginning or finishing in the corresponding area of the spool. Obviously, each tongue when shifted angularly into registry with the radial reference line carrying the same number forms through its arrow M the actual reference mark.

My invention is obviously not limited to the embodiments illustrated hereinabove by way of a mere exemplification and it may obviously form the object of various modifications without thus unduly widening the scope of the invention as defined in the accompanying claim.

What I claim is:

An index carrier for spools of magnetic record strips comprising an opaque carrier member, a system of substantially radial, angularly equidistant reference lines and a perforation forming a tangential reference mark crossing each radial reference line at a point corresponding to a predetermined diameter of the spool during its unwinding, said reference mark being associated with the sequential number of the corresponding radial reference line to define the location of the record section beginning at the point of the strip winding off the spool in registry with said reference mark.

References Cited in the file of this patent

UNITED STATES PATENTS

| | | |
|---|---|---|
| 1,788,784 | Tulchin | Jan. 13, 1931 |
| 2,237,920 | Armitt | Apr. 8, 1941 |
| 2,829,618 | Ostergard | Apr. 8, 1958 |

FOREIGN PATENTS

| | | |
|---|---|---|
| 886,490 | France | July 5, 1943 |